United States Patent [19]
Post et al.

[11] Patent Number: 5,128,085
[45] Date of Patent: Jul. 7, 1992

[54] METHOD OF MAKING A COMPOSITE STYLED WHEEL

[75] Inventors: Charles C. Post, Haslett; Roger E. Swartz, Holt, both of Mich.

[73] Assignee: Motor Wheel Corporation, Lansing, Mich.

[21] Appl. No.: 564,382

[22] Filed: Aug. 8, 1990

Related U.S. Application Data

[62] Division of Ser. No. 353,099, May 17, 1989, Pat. No. 4,976,497.

[51] Int. Cl.⁵ .............. B29C 33/14; B29C 41/20; B29C 53/56
[52] U.S. Cl. ............. 264/254; 264/45.5; 264/46.7; 264/263; 264/266; 264/275; 301/37 P
[58] Field of Search ........ 264/263, 266, 279.1, 264/254, 45.5, 46.7, 265, 275; 301/37 P

[56] References Cited

U.S. PATENT DOCUMENTS

| | | |
|---|---|---|
| 3,669,501 | 6/1972 | Derleth. |
| 4,351,786 | 9/1982 | Mueller ............ 264/263 |
| 4,449,756 | 5/1984 | Weeks ............ 301/37 P |
| 4,682,820 | 7/1987 | Stalter ............ 301/37 P |

FOREIGN PATENT DOCUMENTS 2457907 4/1974 Fed. Rep. of Germany.
840041 7/1960 United Kingdom.

Primary Examiner—Jan H. Silbaugh
Assistant Examiner—A. Y. Oritz
Attorney, Agent, or Firm—Barnes, Kisselle, Raisch, Choate, Whittemore & Hulbert

[57] ABSTRACT

A composite style wheel, and method and apparatus for making the same, including a metal wheel mounting disc and a rim secured thereto adapted to receive a tire thereon, and a composite plastic ornamental overlay covering at least part of the outboard face of the disc and/or rim. The overlay includes a molded in-situ body of relatively high density resilient urethane plastic material permanently affixed to the disc and/or rim and a plastic insert having a weight-to-volume ratio much less than that of the body plastic material. At least the major portion of the insert is disposed radially outwardly from the overlay, aperture wheel mounting and the overlay body plastic material covers the insert so as to completely embed the same in the composite overlay to thereby hide the insert from view and assist in securement thereof to the wheel. The overlay body is cast and cured against the wheel metal with the insert presecured thereto. Preferably the insert includes a resilient yieldable annulus circumferentially extending around the overlay in the valley space.

14 Claims, 3 Drawing Sheets

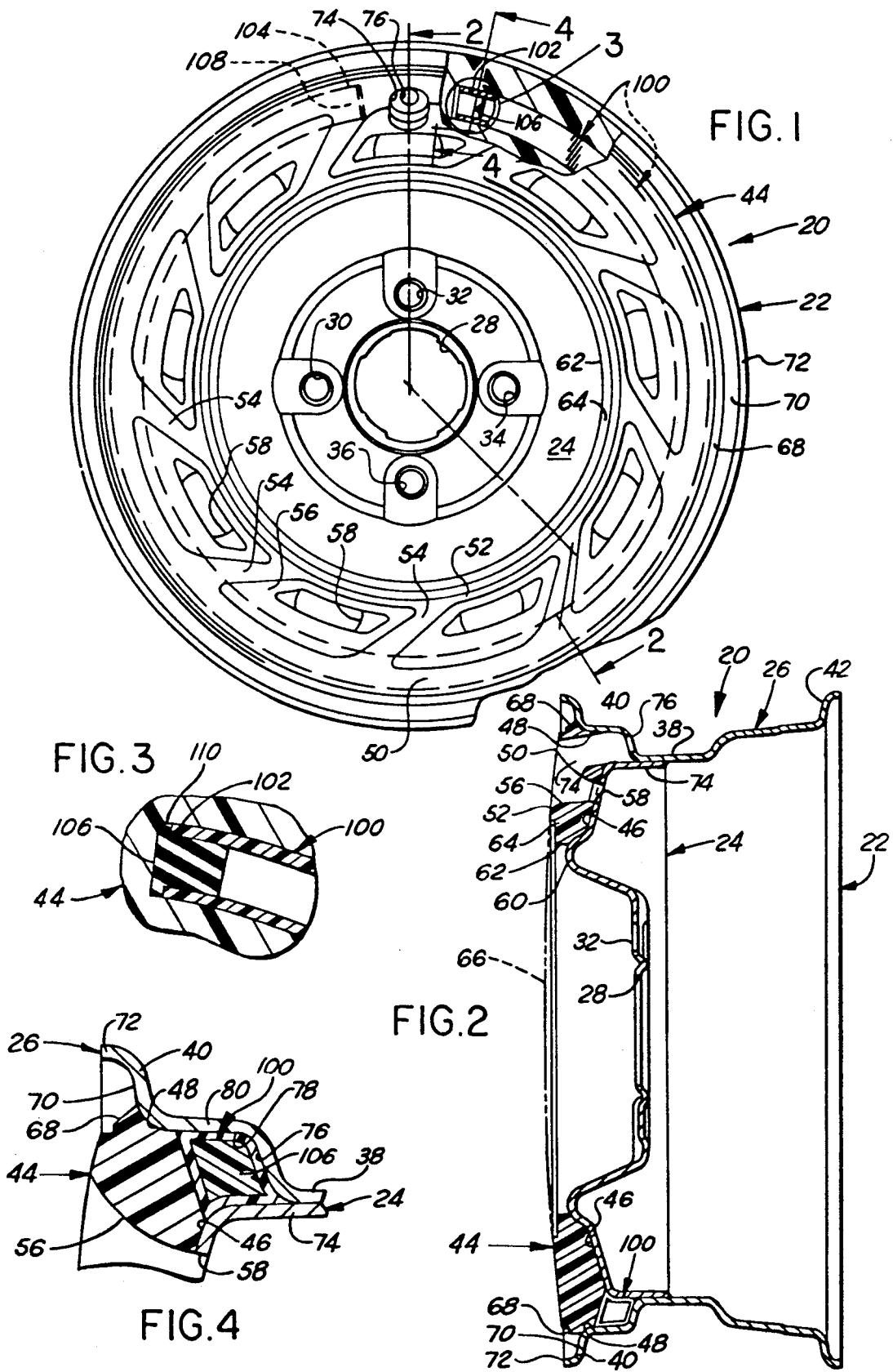

METHOD OF MAKING A COMPOSITE STYLED WHEEL

This is a divisional of co-pending application Ser. No. 07/353,099, filed on May 17, 1989, now U.S. Pat. No. 4,976,467.

FIELD OF THE INVENTION

This invention relates to styled wheels for vehicles, and more particularly to a composite metal-elastomer automotive-type styled vehicle wheel construction with a three-dimensional contoured ornamental outboard face, and to molding apparatus and method for constructing such a wheel.

BACKGROUND OF THE INVENTION

In the early 1970's Motor Wheel Corporation of Lansing, Michigan, assignee of applicant herein, as well as its then parent, The Goodyear Tire & Rubber Company of Akron, Ohio, developed and introduced to the automotive market an improved form of composite metal-elastomer styled wheel sold under the registered trademark "POLYCAST". Such styled wheels provided an automotive-type wheel in which metallic disc and rim parts of simple, conventional "plain Jane" configuration, for which manufacturing equipment was already available, are utilized as the basic structural "backbone" components to thereby obtain a high strength standardized wheel construction at minimum cost. The aesthetically pleasing appearance was imparted to this standard steel backbone by a permanently adhered ornamental plastic body, either molded separately or in-situ as a homogeneous one-piece body, or in the form of a preformed plastic cover secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variation in styling and contour configuration were also obtained than were possible in the previous deep drawn styled all-steel wheels.

Various embodiments of such "POLYCAST" wheels, as well as methods and apparatus for producing the same, are set forth in the following U.S. Pat Nos. assigned to the assignee herein, which are incorporated herein by reference:

| | | |
|---|---|---|
| 3,669,501 | 6/1972 | Derleth |
| 3,756,658 | 9/1973 | Adams |
| 3,762,677 | 10/1973 | Adams |
| 3,794,529 | 2/1974 | Thompson |
| 3,815,200 | 6/1974 | Adams |
| 3,918,762 | 11/1975 | Hampshire |
| 3,935,291 | 1/1976 | Jackson |
| 3,956,451 | 5/1976 | Adams |
| 4,017,239 | 4/1977 | O'Connell et al |
| 4,251,476 | 2/1981 | Smith |
| 4,398,770 | 8/1983 | Smith |
| 4,659,148 | 4/1987 | Grill |
| 4,682,820 | 7/1987 | Stalter |
| 4,786,027 | 11/1988 | Stalter |
| 4,790,605 | 12/1988 | Stalter |
| S/N 285,634 | F/D 12/1988 | Stalter, |

-continued

| | |
|---|---|
| | now U.S. Pat. No. 4,963,083 |

Other prior art patents issued to unrelated parties and directed to various types of styled metal and plastic wheels include U.S. Pat. Nos. 3,823,982, 3,827,756, 3,894,775, 3,915,502, and 3,998,494 as well as British Patent No. 1,290,946 (1972) and German Offenlegungschrift 2,457,907 (Jun. 6, 1976).

In one commercial method of manufacture of such POLYCAST wheels, a portion of the mold comprises a conventional metal vehicle wheel having a drop center rim secured to a central disc or body having the usual bolt circle holes and a central aperture so that the disc can be mounted on an axle, drum or disc brake assembly. The metal wheel is employed in conjunction with an inboard back-up clamp and an outboard mold part to define therewith a sealed cavity for molding and attaching a three-dimensional contoured plastic overlay, the overlay thus being molded in situ and permanently attached to the outboard side of the wheel while in the mold apparatus. Preferably, in one commercial embodiment of this method the wheel forms the upper surface of the mold cavity and a reaction mixture of a urethane elastomer liquid adhesive material is injected or poured into the mold to fill the cavity and contact the outboard surface of the wheel assembly. The urethane material solidifies to form a high density non-cellular elastomer body which permanently adheres to the outboard surface of the wheel subassembly. The plastic overlay may also be constructed from a lower density microcellular closed cell urethane elastomer adhesive material. After the urethane material has solidified in the mold cavity, the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

Due to the orientation of the overlay beneath the wheel disc, the outboard face of the overlay is adjacent the lowermost surface of the mold cavity. Hence reaction-generated gas bubbles tend to rise and migrate toward the inboard portion of the overlay closest to the wheel disc while the reaction mixture is still liquid. This migration results in a variation in density axially of the overlay so that a relatively dense skin is produced adjacent the outboard face of the overlay, the urethane becoming less dense and more cellular axially towards the disc. Any molding defects, such as large pockets or bubbles, will tend to occur adjacent or at the interface of the overlay and the disc where, generally speaking, such defects are less critical and do not spoil the end product, as compared to casting the overlay with the lower mold part inverted and superimposed on the rim and disc subassembly, which tends to locate such casting defects at the outboard face of the overlay.

The higher density skin at the outboard face of the overlay is advantageous from the standpoint of receiving a painted finish, or receiving a decorative surface texture or finish cast into the outboard surface of the overlay, as well as achieving a smooth relatively hard surface less susceptible to damage in use. Preferably the outboard face of the overlay should have a Shore A hardness in the range of at least 85 to 100, with the preferred material having a Shore A the hardness of about 90 to 95. Materials having a lower Shore A hardness of 30 to 60 could be used, but difficulties may be experienced in some applications with such materials flexing or distorting from impacts received as when curbing the wheel. Accordingly, the polyurethanes or elastomers employed in the overlay should have an outboard surface hardness at least equivalent to that of a pneumatic tire to be used with the wheel, such being usually a minimum Shore A hardness of at least 60 and preferably about 70 or higher.

When using a slight blowing urethane material to provide a micro-cellular overlay, a wide range of densities may be obtained ranging downwardly to about 30 pounds per cubic foot. Non-rigid urethane elastomer materials are available having much lower densities than 30 pounds, ranging down into the 20 or 10 pound range, but the skins on an overlay cast from such material tend to be relatively porous, and hence difficulty is experienced in obtaining a satisfactory mirror-smooth surface to be painted, if such is the effect desired. However, when simulating a sand cast aluminum surface of certain aluminum sport wheels, a less dense and more cellular urethane overlay is desirable inasmuch as painting the same with a conventional metallic aluminum paint will result in the paint solvents partially etching the surface and opening up the pores. This in turn gives a surface appearance substantially identical to that of sand cast aluminum. Similarly, if a wood grain effect is to be imparted to the outboard face of the overlay, low density highly cellular urethane overlays are advantageous since they lend themselves to etching finish treatments used in bringing out simulated wood grain effects.

On the other hand, the higher density materials are preferred from the standpoint of structural strength needed to maintain the shape of the overlay, particularly where relatively complicated contours are employed in the overlay, such as protruding air scoops and the like which must retain their physical shape and orientation even when subjected to the distortional effects of road shocks and bump impacts, curb scuffing and centrifugal forces exerted at high wheel speeds. For this reason, densities on the order of 50 pounds or more per cubic foot have generally been preferred in constructing the commercial composite decorative POLYCAST wheel constructions. A density of 53 to 54 pounds per cubic foot has proven to be highly satisfactory in producing the aforementioned simulated aluminum sport wheel having an outboard surface painted with metallic aluminum paint and simulating sand cast aluminum, but with relatively deep axially extending air scoops requiring considerable structural strength in the overlay.

From the foregoing it will be understood that the composite POLYCAST wheel constructions provides several advantages. It had long been customary to "dress up" a non-decorative conventional steel wheel by removably affixing a decorative wheel cover to the outboard face of the wheel. However, with the decorative POLYCAST wheel construction no additional wheel cover is needed, and at the same time a safer product is obtained because the non-metallic overlay is permanently affixed to the wheel in a very secure manner. Hence there is no accidental detachment problem, a hazard which is associated with conventional removable wheel covers which can and do on occasion fly off a wheel of a passenger vehicle while traveling at high speed. The mechanical fasteners, clips, etc. associated with wheel covers may also be eliminated. Affixing the elastomer overlay to the wheel disc with a permanent adhesive bond during manufacture of the wheel rather than as a later add-on insures better control of this safety factor. The casting or molding in place of the overlay also insures that the mass of the decorative overlay is positioned in a concentric and arcuate relationship to the wheel disc and rim so that the resulting composite wheel is well balanced, dynamically and statically. Although it is to be understood that POLYCAST wheel constructions include those in which the elastomeric decorative overlay is cast or molded as a separate entity from the rim and disc of the wheel, and then subsequently permanently attached to the outboard face of the wheel rim and/or disc such as by a suitable adhesive, this alternative construction requires additional assembly and fixture apparatus in order to achieve the necessary concentricity and balance tolerances. Hence, the cast-in-place method described previously has been preferred commercially because less production equipment is required and the separate attachment step is eliminated.

Another advantage of composite decorative POLYCAST wheels is the flexibility they provide to both the wheel designer and to the wheel manufacturer. The designer can exercise wider latitude in his choice of shapes and contours since the designer is no longer inhibited by the limitations involved in deep drawing of the metal of the wheel disc in order to achieve an aesthetically pleasing appearance. The wheel manufacturer can economically produce a standard steel wheel rim and disc subassembly for a whole series of different wheel designs, thereby greatly reducing production costs because of this standardization. The extensive capital investment required in drawing equipment is greatly reduced, and design changes can be quickly accomplished with only a minimum of re-tooling of the comparatively inexpensive molding equipment required to cast the non-metallic decorative overlay against the wheel.

Due to the elastomeric nature of the overlay, it provides a further safety feature in that it can serve as a cushion which offers protection to the main structural steel components of the wheel in the event of a side impact, as when the wheel strikes a curb, thereby reducing the exposure of these components to stress risers and cracks. It has also been found that the urethane elastomer will flow during pouring and curing into the minute clearance spaces in the interface between the rim and disc which may remain between the circumferentially spaced spot or arc welds joining the same. This will provide a thin resilient cushion between these steel parts of the wheel which is believed to reduce wheel-generated noise, transmission of noise through the wheel, and corrosion. In recent years the wheel disc peripheral flange has been designed to have a press-fit assembly into the rim well inner peripheral surface. Due to this tight fit, very little air leakage will be obtained via the rim-disc interface during the mold filling operation even though the rim-disc weld joint is circumferentially discontinuous. Hence, with this type of rim-disc subassembly, four equally angularly spaced external air vent grooves are provided in the disc peripheral flange, each measuring about one millimeter in radial depth and about four millimeters wide (circumferentially of the disc flange). This venting of the root of the rim-disc outboard valley space helps insure full filling and penetration of the mold cavity by the liquid urethane reaction mixture, as well as providing the aforementioned cushion and noise reduction effect.

It also is to be understood that the overlay may also cover a portion or all of the outboard face of the wheel rim and be adherently secured thereto in the same manner as it is to the disc. Such additional coverage helps further reduce any transmission of noise through the wheel. In some instances, the overlay may overlie and be secured only to the rim, leaving the entire disc or a portion thereof uncovered and exposed to view.

The inventions of the above-listed "POLYCAST" wheel patents have achieved widespread commercial success: millions of such "POLYCAST" wheels having been successfully made and sold over the past eighteen years in an almost infinite variety of decorative configurations and ornamentation of the plastic outboard face component. Moreover, in view of the foregoing factors, the molded in-situ urethane decorative body improvement as disclosed and claimed in the above-listed Adams '677, '200, '762 and '451 patents have been favored commercially over the particular exemplary embodiments of the POLYCAST wheel invention as first disclosed in the above-listed pioneer Derleth U.S. Pat. No. 3,669,501 and the particular improvement thereon disclosed and claimed in the above-listed Smith U.S. Pat. No. 4,251,476, i.e., a vacuum formed ABS plastic outer cover or a spray-applied outer skin material adhered by a low density urethane foam to the metal components of the wheel. In addition, the density of the urethane employed in the commercial POLYCAST wheels has remained in the 40–50 pounds per cubic foot range despite the obvious weight disadvantage of employing the higher versus lower density urethane materials and/or the particular exemplary light-weight embodiment of the POLYCAST wheel disclosed in the Derleth '501 and Smith '476 patents.

Among various attempts in the prior art to solve the weight reduction problem in composite plastic and steel wheels utilizing a homogeneous decorative body construction, the prior art Kronprinz AG Brinkmann et al German Patent (Offenlegunschrift) 24 57 907 may be noted. This patent discloses a POLYCAST type wheel construction intended to reduce the weight-to-volume ratio of the plastic portion to thus reduce the total weight of the wheel by providing cavities between the wheel disc and the plastic part. In the embodiment of FIG. 1, the plastic part 12 is made as a preform separate from the wheel with cavities 3 in the inner peripheral face of the plastic part 12 to reduce the weight of the same. The preformed plastic part 12 is affixed to the rim 1 at 14 by gluing.

In the embodiment of FIG. 2 the plastic part 12 is formed in-situ by mold foaming the same onto the vehicle wheel by using the cover mold 15 as in the aforementioned Adams Patents. In this process the weight reducing cavities 3 are formed by using film plastic bags 5 filled with a filler material 4 disposed in the mold cavity. Each bag 5 has a film portion 5a which serves as a pull tab extending outside of the mold cavity between the inner peripheral edge of the mold lid 15 and the disc crown 2a. After the mold cavity has been filled with the urethane material to form the plastic portion 12 and the mold cover 15 removed from the wheel, bags 5 are pulled from beneath the plastic part 12 toward the center of the wheel to leave the cavities 3. In order to permit removal of the core bags 5, mold release material is provided on the bags and the wheel disc, and the inner periphery 12a of the plastic part 12 must rest loosely against the wheel disc 12 rather than being adhered to the same. The free parts of the wheel disc 2 which remain between the bags 5 are likewise provided with a separating agent, so that the plastic part 12 can yield sufficiently to enable the bags 5 to pull out from beneath the same.

The resulting bag-cored cavities 3 are thus circumferentially spaced from one another around the plastic part so as to be disposed circumferentially individually between the disc vent holes. Accordingly, the weight reduction obtainable is limited by this relatively expensive approach to the problem. Penetration and coverage of the plastic material to juxtaposed rim and disc outboard faces and joints is also severely comprised and security of attachment is less than desirable. In any event, so far as is known, this approach has not to date been deemed a practical solution to the weight reduction problem.

Other possible solutions might initially appear to reside in prior art patents directed to other aspects of composite metal and plastic wheel constructions. For example, the aforementioned Motor Wheel Grill U.S. Pat. No. 4,659,148 shows in the embodiment of FIGS. 1-9 a POLYCAST wheel construction with retainer 60 secured to the outboard face of the wheel disc and having a wall encircling the disc holes so as to separate the overlay material from the bolt circle area of the disc. The overlay material engulfs the retainer wall and thereby hides some or all of the retainer from view, and assists in securement of the retainer to the disc. The Grill embedded retainer enables the "POLYCAST" wheel to have a "full-face" decorative appearance while keeping the urethane material of the decorative overlay away from the bolt circle region 64 so that the urethane is not damaged by excessive heat generated during braking, which causes high temperatures in the bolt circle region 64. In some embodiments, a "POLYCAST" wheel construction made pursuant to the Grill '148 patent would have some weight savings over a comparable full-face POLYCAST wheel wherein the urethane extended down into the bolt circle region, absent the retainer 60.

The 1975 Connell U.S. Pat. No. 3,915,502 shows a preformed rigid plastic wheel cover 12 adhered to the outer face of the metal wheel disc 30 by a double-coated adhesive tape 40 of circular shape disposed at the crown of the disc. The outer periphery as well as the inboard face of the wheel cover are configured to leave voids or spaces between these cover faces and the juxtaposed faces of the wheel disc and rim. The tape 40 is stated to permanently mount the wheel cover to the wheel disc, and hence, as in POLYCAST wheel constructions, clearance holes are provided in the cover to permit the wheel to be removed from the wheel hub without the need to remove the cover from the wheel. Although no mention is made of reduction in weight from the Connell "taped-on" plastic wheel cover arrangement, the voids between the cover and wheel would inherently perform this function. However, the evident drawbacks of this approach to a POLYCAST wheel undoubtedly explain why the same, so far as is known, has not been commercialized to date.

The 1975 Christoph et al U.S. Pat. No. 3,894,775 provides a disclosure similar to that of the Connell '502 patent in that Christoph et al shows a rigid plastic wheel cover which, in most if not all of the disclosed embodiments is permanently affixed to the wheel and provided with clearance holes or large center opening (FIGS. 15 and 16) for the wheel mounting bolts to permit the wheel to be removed from the axle without the need to remove the cover from the wheel. In the embodiments of FIGS. 1 and 2 the inboard face of the wheel cover is configured to leave voids or spaces between the cover and the juxtaposed outboard faces of the wheel disc and rim. Again, although no mention is made of reduction in weight from the Christoph et al plastic wheel cover arrangement of FIGS. 1 and 2, the voids between the cover and the wheel would inherently perform this function in the same sense as would conventional removable wheel covers. Again, so far as is known, the Christoph et al construction has not been commercialized to date.

The Motor Wheel Weeks U.S. Pat. No. 4,449,756 is of general interest to show in the FIG. 3 embodiment of a military tank wheel a separately formed insert 40, formed of an injection molded elastomeric material in the form of a hollow tubular structure of tough closed-cellular material. In assembly, insert 40 is cut to desired length and then permanently sealingly secured to the wheel 12 with opposing ends in sealing abutment as at 42. The purpose of insert 40 is to fill the mud collecting annular channel pocket formed by the cup-shaped configuration of rim 16 and disc 14 of a military tank or other tracked vehicle wheel. Insert 40 is intended as an alternative embodiment to the molded in-situ urethane bodies of the embodiments of FIGS. 2 and 4. Of course, there is no teaching or suggestion in the Weeks '756 patent that insert 40 could be used in any manner as a weight reducing insert in combination with the urethane bodies of FIGS. 2 and 4, much less in an automotive POLYCAST styled wheel construction.

OBJECTS OF THE INVENTION

Accordingly, among the objects of the present invention is to provide an improved composite metal-elastomer wheel construction of the aforementioned "POLYCAST" styled wheel type which accomplishes an overall reduction in the weight-to-volume ratio of the decorative plastic overlay component, and hence total wheel weight, while retaining the many advantages of the aforementioned Adams patents embodiments of POLYCAST wheel construction.

Another object is to provide an improved composite wheel construction of the above character which is simple and reliable in construction and relatively inexpensive to manufacture.

A further object of the present invention is to provide an improved method and apparatus for making a composite wheel of the above character in an economical and reliable manner, and which is compatible with the prior commercial method and apparatus for making prior art wheels of this type.

BRIEF DESCRIPTION OF DRAWINGS

The invention, together with additional objects, features and advantages thereof, will be best understood from the following detailed description taken in conjunction with the appended claims and accompanying drawings, wherein:

FIG. 1 is an elevational view of an exemplary first embodiment of a vehicle wheel constructed in accordance with the present invention as viewed from the outboard face thereof, with portions broken away to better illustrate detail.

FIG. 2 is a cross-sectional view taken on the line 2—2 of FIG. 1.

FIG. 3 is a fragmentary view of the portion shown in circle III of FIG. 1 but greatly enlarged thereover.

FIG. 4 is a fragmentary cross sectional view taken on the line 4—4 of FIG. 1.

DETAILED DESCRIPTION OF INVENTION

First Embodiment

Figure 5:
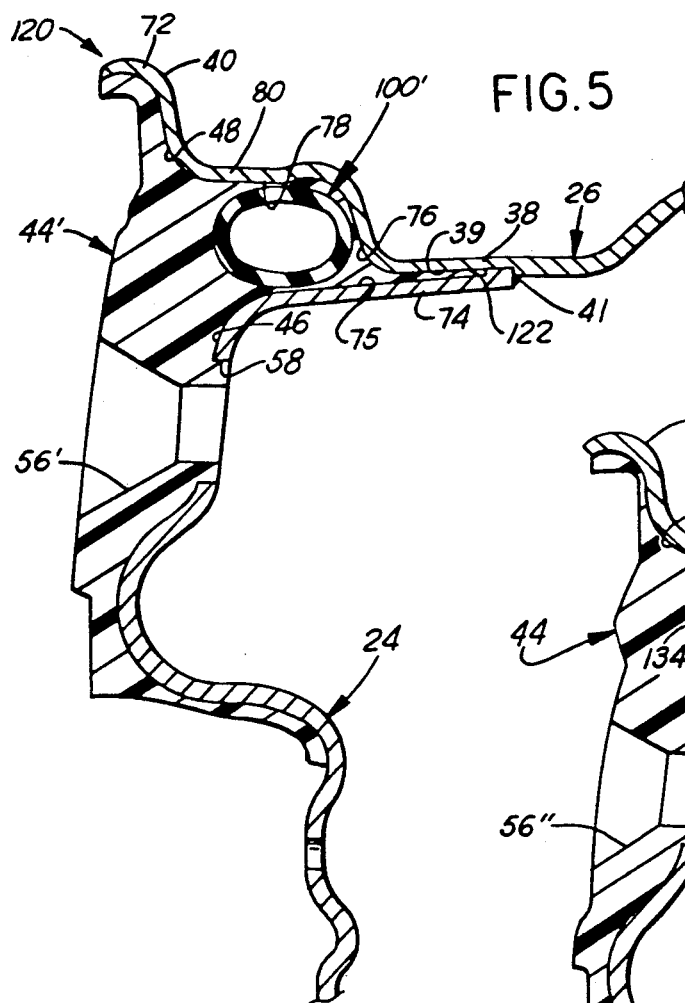
FIG. 5 is a fragmentary cross-sectional view of a second embodiment of the present invention illustrated as a half-section taken radially of the wheel construction.

Referring in more detail to the accompanying drawings, particularly FIGS. 1 and 2, the first embodiment 20 of a wheel assembly in accordance with the invention as illustrated therein comprises a metallic wheel 22 including a wheel disc 24 and a drop center rim 26 of conventional configuration secured around and to the periphery of disc 24. Disc 24 includes a central opening 28 adapted to be received over a wheel hub, and a circumferential array of bolt openings 30, 32, 34, 36 surrounding hub opening 28 and adapted to be received over the usual threaded lugs for mounting wheel 20 to a vehicle wheel hub or spindle. Rim 26 includes a drop center well 38 and the usual axially spaced tire bead retaining flanges 40 and 42 for mounting thereon a typical tubeless pneumatic tire (not illustrated). The cross sectional contour and other details of disc 24 and rim 26 may be of any suitable configuration and do not per se form part of the present invention.

A molded or cast overlay 44 is permanently secured to the axially outboard face 46 of disc 24 and to that portion 48 of the radially inwardly facing outboard surface of rim 26 contiguously adjacent disc outboard face 46. Most preferably, overlay 44 comprises an elastomeric urethane construction permanently adhesively affixed to wheel faces 46 and 48 by reason of being molded thereon in a manner as taught in the aforementioned Adams U.S. Pat. Nos. 3,756,658, 3,762,677, 3,815,200 and 3,956,451, with certain modifications to these teachings in accordance with the present invention as set forth in more detail hereinafter.

In wheel embodiment 20 the decorative plastic overlay 44 is molded, by way of example, to provide on its outboard face concentric outer and inner annular surfaces 50 and 52 interconnected at circumferentially spaced intervals by swept back spoke faces 54 which define, between adjacent pairs of faces 54, swept back inwardly tapering pockets 56. The inboard ends of pockets 56 individually communicate with an annular row of disc vent openings 58. In the particular embodiment of the POLYCAST design of FIGS. 1-4, the decorative plastic overlay body 44 is disposed entirely radially outwardly of the crown 60 of disc 24 and has a cylindrical inner peripheral surface 62 and an inset surface 64 contiguous therewith on which a removable hub cap is to be seated as indicated by the phantom line 66 in FIG. 2. The outer peripheral surface 68 of body 44 terminates at the outboard face 70 of flange 40 radially inwardly of the free edge 72 of flange 40 to facilitate attachment of wheel balance weights thereto.

It will thus be seen that if the first embodiment POLYCAST design the decorative overlay body 44 were to be constructed in accordance with the prior art, the urethane material would be disposed to fill in the "valley" of the outboard wheel face defined at its inboard extremity by the junction of the peripheral flange 74 of disc 24 with rim well 38, with the sides of the valley being defined by the respectively radially inwardly and outwardly divergent disc and rim outboard faces 46 and 48. This valley zone has required in most prior art POLYCAST wheel designs a relatively high volume of urethane material to occupy the relatively large axial dimension between the outboard face of body 44 and the bottom of this rim-disc valley junction. It is also to be noted that in most, if not all, POLYCAST wheel designs wherein the overlay is to cover the outboard face 48 of the rim as well as the disc outboard face 46, the aesthetics as well as static and dynamic balance of the wheel design must be slightly compromised by the provision of an access opening 74 (FIGS. 1 and 2) in body 44 registering with an air inflation valve opening 76 in rim 26. However this compromise in aesthetics is not considered a commercial disadvantage inasmuch as the same must also be provided in conventional removable wheel covers.

In accordance with a principal feature of the present invention, the weight-to-volume ratio of the relatively high density urethane decorative body 44 is significantly reduced by the provision of a light weight, very low weight-to-volume ratio insert body permanently embedded in overlay 44 so as to be hidden from view and constructed so as not to impair the aforementioned desirable parameters of POLYCAST wheel constructions. In the embodiment of FIGS. 1-4, this weight-reducing insert comprises a hollow tubular insert 100 which may be made as an extrusion so as to have a cross sectional outer contour as best seen in FIG. 4 matching the outboard face 46 of disc 24, the outboard face 76 of rim well 38 and the outboard face 70 of the rim bead seat 80 such that insert 100 may nest snugly into the bottom of the rim-disc valley. As best seen in FIG. 1, tube 100 is made as a split annulus so that its parted ends 102 and 104 in installed position are spaced apart a predetermined distance so as to flank valve hole 74. Preferably, each of the tube ends 102 and 104 is sealed shut by a stopper 106 and 108 respectively, which may be, as shown, in the form of a solid plug having the cross sectional contour of the inner periphery of tube 100 and having a flange 110 at its head end to abut the associated end surface of tube 100. In accordance with another feature of the present invention, plugs 102 and 104 are made of a suitable plastic material, which may be the same as or compatible with the plastic material of tube 100, and have an axial length dimension correlated with the cross-sectional area of the plug such that the combined weight of plugs 102 and 104 is the correct value to offset a given weight of the urethane material of body 44 required to fill the cavity 74, minus the volume of urethane material remaining in body 44 in the parting gap between the tube ends 102 and 104 which would have been occupied by tube 100 had the same been continuous through the valve hole area. This calculation is thus predetermined to provide static balance of wheel 20 despite the valve hole cavity 74 and rim hole 76. Hence this previous amount of static and dynamic imbalance introduced into the POLYCAST design by the aysemetric valve hole cavity 74 no longer need be compensated in the mass and location of the conventional balance weights to be attached to the wheel in the final balancing of the same.

Preferably tube 100 is extruded from a light weight, low cost plastic material such as polyethylene so as to have a very low weight-to-volume ratio as compared to the urethane material of body 44. In accordance with one embodiment of the method of the invention, tube 100 is cut to the appropriate running length such that its circumferential length in its installed annular form in the rim-disc valley will bring the parting ends 102 and 104 into close flanking relation with the valve cavity 74. The conventional extruder employed to make tubular insert 100 may be designed in accordance with the customary practice so as to extrude tube 100 in a coil form having a coil diameter close to valley diameter to facilitate initial placement assembly with the wheel. End plugs 106 and 108, made in accordance with the aforementioned predetermined size and weight parameters, are inserted with a press fit into the open ends 102 and 104 of tube 100. Tube 100 is then inserted with a slight press fit into the rim-disc valley to the position thereof shown in FIGS. 1, 2 and 4 so as to be temporarily mechanically captured by the rim and disc to permit handling of the wheel subassembly without danger of the tube insert 100 becoming loose or falling away from the wheel. The wheel disc and rim subassembly with tubular insert 100 temporarily retained thereon is then clamped onto the aforementioned lower mold part and a liquid urethane reaction mixture material is introduced into the mold cavity to form the overlay 44, as set forth in more detail in the aforementioned Adams POLYCAST patents.

It is to be noted that insert tube 100 during the molding operation provides an imperforate barrier to prevent entry of liquid urethane material to the interior space of tube 100 as the same is being introduced to fill the mold cavity defined between the outboard face of the metallic parts of the wheel, the outboard face of tubular insert 100 and the juxtaposed mold cavity surface (not shown). The urethane flows over and covers the outboard surfaces 46 and 48 of the disc and rim as well as insert 100 to form the as-cast shape of body 44 shown in FIGS. 1 and 2. Once cast and cured, overlay 44 completely covers the tubular insert 100 so that the same is completely hidden from view and is permanently embedded in fixed position in body 44. The adhesion of the urethane material of body 44 to the metallic surfaces 46 and 48 is sufficient to provide secure retention of body 44 onto the outboard faces of the rim and disc despite the surface areas covered by insert 100. Moreover, when wheel 20 is molded in accordance with the aforementioned Adams POLYCAST patents, the outboard face of body 44 will be molded against the steel mold cavity surface of the lower mold part and hence a smooth, tough, durable skin will form at the outer surface of overlay 44. Decorative body 44 also will have the appropriate structural strength and resilience characteristics desired in its outboard region. In addition, because body 44 is completely molded in-situ to the steel parts of the wheel, the resultant product retains the other aforementioned advantages of the Adams POLYCAST patents, e.g., a tight bond and good seal of body 44 to these metal surfaces is obtained which helps inhibits corrosion during usage of the wheel in service, thereby enhancing wheel life.

It is to be understood that, during use, the wheel 20 is continuously subjected to road forces tending to deform the rim from its initial circular shape. In addition to the circumferential deformation of the rim due to the normal component of vehicle load, severe road conditions, e.g., bumps, potholes, etc., can induce even more severe rim deformation. Wheel disc 24 experiences under these conditions only a minimal amount of deformation, much less than that to which the rim is subjected. Accordingly, it is necessary that body 44 and insert 100 be able to accommodate this relative movement between the rim and disc under these conditions without damage thereto. Insert 100, being in the form of a hollow tube and made of resilient or flexible plastic material, can and does, like the urethane material of body 44, flex and resiliently yield as required to accommodate such wheel flexing stresses. Moreover, this is accomplished without the need for the undesireable peripheral inboard open-to-ambient clearance spaces of the rigid cover disclosed in the above-noted Connell '502 patent.

Second Embodiment

FIG. 5 illustrates a modified composite wheel 120 similar to wheel 20, like reference numerals being utilized to indicate like elements from wheel 20, and reference numerals raised by a prime suffix indicating similar elements alike in function, and for brevity their description not repeated. Wheel 120 differs from wheel 20 in that the same is provided with a second embodiment of a tubular, weight-reducing insert 100' which, unlike the custom contoured extrusion 100, is made from a simple, less-expensive cylindrical cross section tube of plastic material such as polyethylene, which is readily commercially available as a standardized "shelf-item" product for a variety of common uses, such as garden hose and the like. Insert 100', like insert 100 is selected of an appropriate coil diameter to nest in the rim-disc valley of wheel 120, cut to appropriate circumferential length, provided with the pre-sized plugs 106, 108 to seal the insert ends at the parting gap, and straddles the valve stem opening of the urethane body 44'. Typically, the cross-sectional outside diameter of tube 100' is selected to be slightly larger than the spacing radially between the outer periphery 75 of disc flange 74 and the underface 78 of bead seat 80. Hence when insert 100' is pressed into the disc-rim valley the same will be squeezed to the oval cross sectional configuration illustrated in FIG. 5 to provide temporary retention required for holding insert 100' in place ready for the POLYCAST molding operation described previously. During this operation, the injection pressure as well as reaction generated pressure of the liquid urethane reaction mixture will be sufficient to cause insert 100' to flex in a radially squeezing direction (greater ovality). This allows the liquid urethane mixture to flow past insert 100' in an axial inboard direction relative to the wheel to fill any gaps or spaces between disc flange 74 and the underface 39 of rim wheel 38 to form sealing "fingers of urethane material illustrated at 122 in FIG. 5. The liquid urethane also flows axially inboard between the circumferentially spaced welds 41 joining the rim and disc to provide a good seal in this area of the disc-rim junction. Again, the construction of the second embodiment of FIG. 5 provides a significant weight reduction improvement having all the aforementioned advantages of the first embodiment of FIGS. 1–4, but at less cost with the further advantage of the axially inboard flow migration of the urethane material to provide enhanced corrosion resistance and noise reduction.

For example in the second embodiment when constructed to scale as shown in FIG. 5, tube 100 has a weight of 0.1 pounds. In a typical automotive passenger vehicle wheel as illustrated in FIGS. 1 and 2 having a diameter of fourteen inches and a width of 5.5 inches, the total weight of the urethane material of body 44 displaced by tube 100 is about 1.3 pounds, when the urethane material of body 44 is selected to have an average density of about 50 pounds per cubic foot. Thus, the weight savings provided by insert 100 is about 1.2 pounds, which in turn represents a 5% reduction in the overall weight of wheel 20.

Third Embodiment

Figure 6:
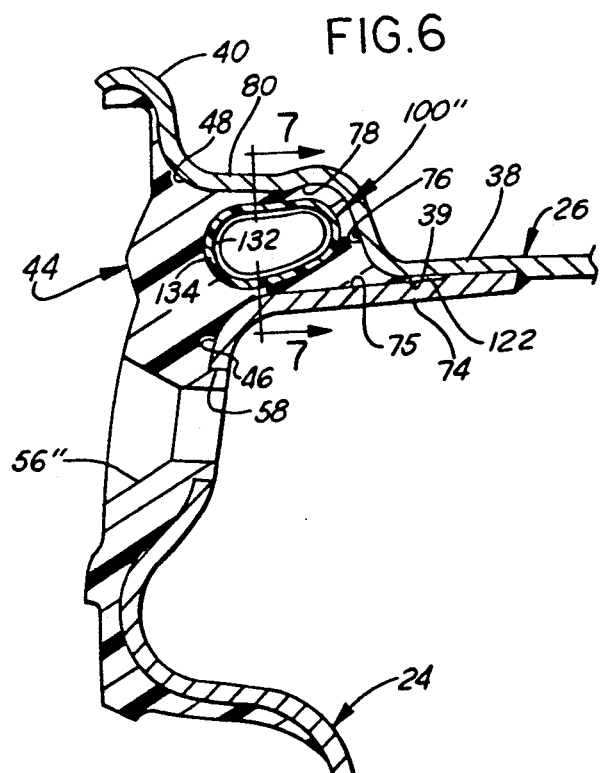
FIG. 6 is a fragmentary cross-sectional view of a half-section of a third embodiment of a wheel construction of the present invention.
Figure 7:
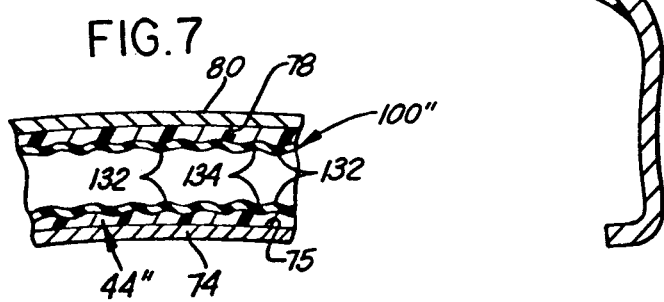
FIG. 7 is a fragmentary cross-sectional view taken on the line 7—7 of FIG. 6.

Referring to FIGS. 6 and 7, a further modified wheel 130 is illustrated employing the principles and features of the present invention like reference numerals identifying components described previously, and reference numerals raised by a prime suffix indicating elements of similar function. Wheel 130 utilizes a third embodiment 100' of a tubular weight-reduction insert which again is a tube cut to appropriate length to form an annulus provided with balancing seal plugs at the parting gap for the valve stem opening as in the first and second embodiments. Like tube 100', tube 100" is made from commercially available plastic tubular material of low density and high strength, such as automotive radiator hose or heat-resistant wiring harness tubular shielding material, which is corrugated in the usual manner to add strength and flexibility to the hose. Thus, as best seen in FIG. 7, hose 100" has alternating radially inwardly and outwardly protruding ridges 132, 134 respectively which run circumferentially around tube 100". In addition to adding strength to tube 100' radially across the same, these corrugations provide augmented flow-by spaces for the liquid urethane reaction material during molding of overlay body 44". This facilitates axially inboard flow of the material to the valley-space behind insert 100" to thereby enhance filling of the root surfaces of the disc-rim valley and to form the sealing fingers 122 as described previously. Although insert 100" is shown in FIG. 6 spaced from surfaces 75 and 78 radially of wheel 130' it is to be understood that the free state diameter of tube 100" is selected to be greater than the spacing radially of the wheel between surfaces 75 and 78 for the initial press fit assembly of tube 100" into the disc-rim valley. However, at the completion of molding, the liquid urethane reaction material may squeeze tube 100" into the more flattened shape illustrated in FIG. 6, and hence the same may become spaced from surfaces 75 and 78 as a result of this final full mold pressure exerted by the liquid urethane reaction material.

Fourth Embodiment

Figure 8:
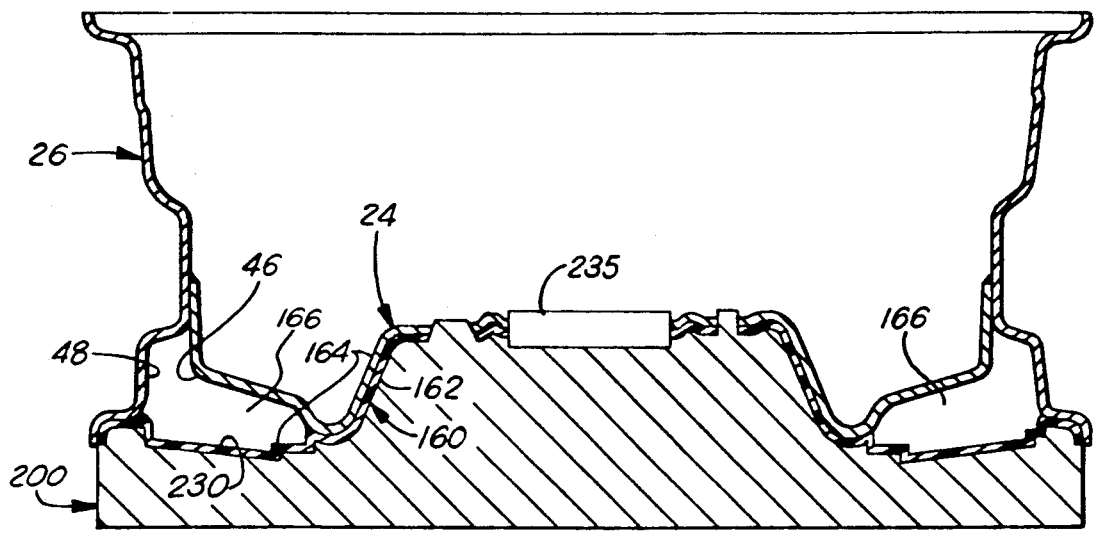
FIG. 8 is a cross-sectional somewhat simplified view sectioned diametrically and illustrating one step utilizing method and apparatus of the invention to construct a fourth wheel embodiment of the present invention.
Figure 9:
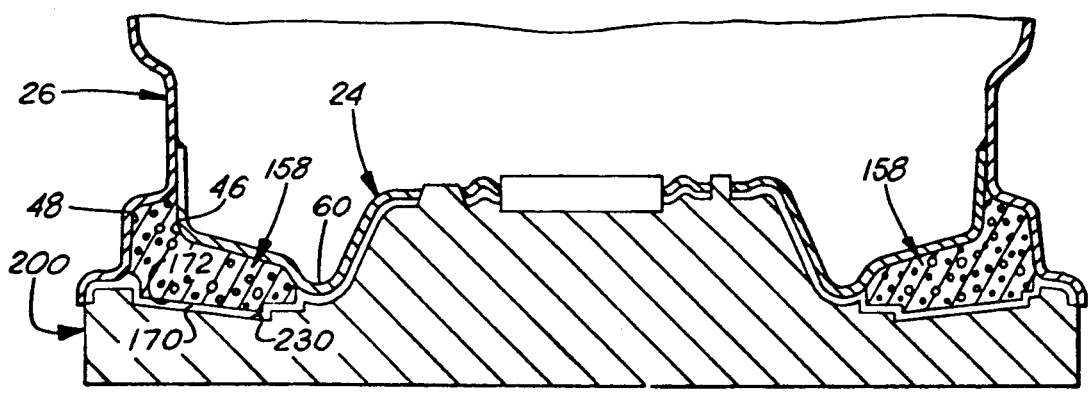
FIG. 9 is a cross-sectional view similar to that of FIG. 8 but illustrating another step employed in the fourth embodiment wheel construction.
Figure 10:
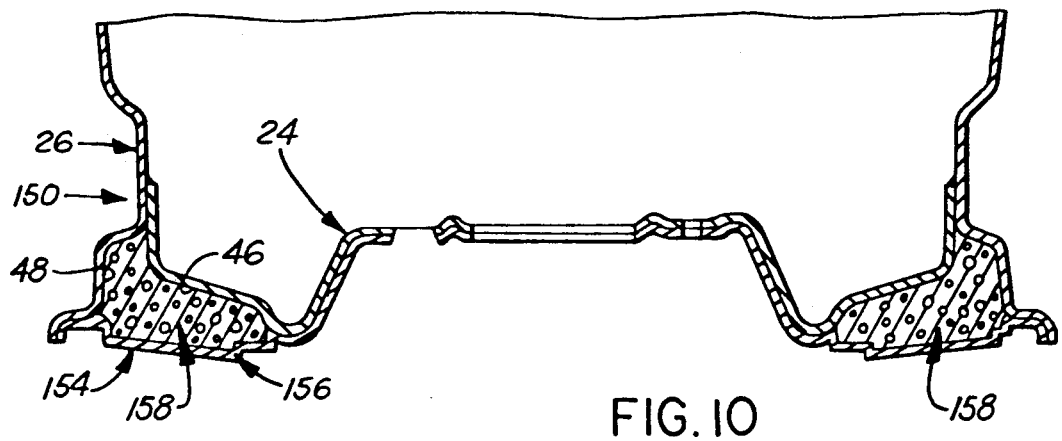
FIG. 10 is a cross-sectional view similar to those of FIGS. 8 and 9 but illustrating the completed fourth embodiment wheel construction.

FIGS. 8, 9 and 10 illustrate still another embodiment of a wheel construction 150 (FIG. 10), and method and apparatus for making the same, in accordance with the present invention, like reference numerals being applied to identical elements described previously. Referring first to FIG. 10, wheel embodiment 150 again includes the steel disc 24 and rim 26, and has a decorative plastic body 154 covering the outboard faces 46 and 48 of the disc and rim which is permanently adhesively affixed thereto to provide a composite metal-elastomer styled POLYCAST vehicle wheel construction. Body 154 is similar to the previously described bodies 44, 44' and 44" in that it comprises a layer of urethane elastomeric material 156 forming the outermost outboard surface of the body exposed to view, and has a relatively high density skin at its outboard face in accordance with the aforementioned Adams patents. This urethane portion 156 of body 154 preferably is made of the relatively high density (e.g., 55 lbs. per cubic foot) urethane material and has cross-sectional thickness sufficient to impart adequate structural strength, durability and impact resistance for the use intended. Preferably, outer layer 156 is constructed of sufficient strength to be substantially self-supporting yet flexible in those areas spaced axially outboard of the metal disc and rim substrate 24-26 to which layer 156 is directly permanently adhered. Body 154 also has a weight-reduction insert 158 filling the disc-rim valley space inboard of the urethane layer 156 which is made of a suitable plastic material having a very low density in order to reduce the weight-to-volume ratio of body 154. Suitable materials for use in making insert 158 may be a low density but semi-resilient urethane foam material as disclosed in the aforementioned Adams patents, as well as in the aforementioned Derleth U.S. Pat. No. 3,669,501 and Smith U.S. Pat. No. 4,251,476 patents having a relatively large open cell or closed cell characteristic and of higher rigidity than the urethane facing 156. Other low density foam materials such as polystyrene, foam rubber, and low density urethane may also be employed in constructing insert 158 provided the same have a suitable compatibility with the liquid urethane reaction mixture employed in constructing facing 156, as well as sufficiency to withstand wheel flexing without structural degradation.

Wheel 150 may be made by the method and apparatus as shown in somewhat simplified form in FIGS. 8 and 9 in accordance with the principles of the present invention. Referring to FIG. 8, the Adams patents molding apparatus is utilized to the extent of providing the lower mold part 200 as disclosed in the aforementioned Adams patent, the middle mold part consisting of the disc and rim subassembly 24, 26, and an upper mold part consisting of a back-up clamp (not shown) to force the disc and rim subassembly against the lower mold part. It is also to be understood that the various improvements in molding method and apparatus as disclosed in other of the above-listed POLYCAST patents may likewise be utilized to advantage, depending upon the particular type and styling of POLYCAST wheel construction to be manufactured in accordance with the present invention.

Referring again to FIG. 8, the molding apparatus also includes, in accordance with the present invention, a preformed mat-like core sheet 160 which is shaped on its outboard face to lay snugly against and conform to the mold-cavity defining upper surface 230 of the lower mold part 200. Mat 160 may be made by molding the same from relatively rigid and durable synthetic rubber or silicone materials, or suitable high density urethane materials, and has a cross-sectional thickness corresponding to the minimum desired cross-sectional thickness dimension of the urethane outer portion 156 of body 154. Although this thickness dimension may vary somewhat across the outboard face of wheel 150, generally the minimum thickness should be at least about one quarter inch, measured perpendicularly between the outboard and inboard faces 162 and 164 of mat 160. Also, the cross-sectional thickness of core mat 160 generally is greater in those areas which are to be disposed out of contact with the disc 24 and/or rim 26 of the metal wheel subassembly.

Mat 160 is adapted to be placed on lower mold surface 230 in the mold-open condition prior to seating of the disc-rim subassembly 24, 26 downwardly thereagainst as shown in FIG. 8 and the same fixtured against the lower mold part by the upper mold part clamp. With the mold closed as shown in FIG. 8, a mold cavity 166 will be defined between the inboard face 164 of mat 160 and a portion of the juxtaposed outboard faces 46 and 48 of the disc and rim. Outer portions of outboard disc and rim faces 46 and 48 are seated in face-to-face contact with mat 160, e.g., in the crown and bolt-circle zones of disc 24 and in the outboard tire-bead retaining flange zone of rim 48. As indicated previously, mat 160 may be made thinner in these contact areas.

Although not shown, lower mold part 200 has a suitable core projection for defining the valve stem opening in body 154, as will be understood from the aforementioned Adams patents, and mat 160 is apertured to slip over this core. Mat 160 is also apertured to slip over any other core protrusions of the lower mold part 200, such as the bolt hole core protrusions, center pilot core or hub hole protrusions and/or locating core protrusions. Moreover, if the POLYCAST wheel styling calls for the urethane facing 156 to terminate radially outwardly of the bolt circle region of disc 24, or even radially outwardly in the vicinity of the disc crown 60, mat 160 would thus likewise be centrally apertured to terminate at the desired radially inner periphery, such as surface 62 in FIG. 2. Mat 160 may also have the required three dimensional contour to produce the vent pockets of the decorative body design, such as pocket 56 of the first embodiment.

With the mold apparatus in closed condition as shown in FIG. 8, the aforementioned liquid reaction mixture selected from the low density foam materials described above is injected through a suitable pour opening provided in disc 24 (not shown) into the "insert" mold cavity 166 so as to completely fill the same and thereby mold in-situ a weight-reducing insert 158 against the outboard faces 46 and 48 of the disc and rim. After such insert plastic material has cured sufficiently for demolding, the rim and disc subassembly 24 and 26 with insert 158 adhered thereto is lifted from the lower mold part. A suitable mold release coating may be applied to the inboard face 164 of mat 60 prior to fixturing of the middle mold part thereon so that insert 158 will readily strip from mat 160 during mold separation. Alternatively, mold release material may be applied to the outboard face 162 of mat 160 so that the same will loosely cling to insert 158 and the outboard surface of disc 24 during mold separation, and then mat 160 stripped from the wheel subassembly after the same has been separated from the mold. When mat 160 is made of suitable conventional silicone rubber materials, the same is essentially self-stripping.

At this point in the method of making wheel 150 the same is partially completed as shown in FIG. 9 with the low density insert 158 adhered to the disc and rim middle mold components. With mat 160 absent from the mold, the disc-rim subassembly 24, 26 with insert 158 molded thereon is then refixtured upon the lower mold part 200. The modified middle mold part now defines a mold cavity 170 between the upper face 230 of the lower mold part 200 and the juxtaposed outboard face 172 of insert 158, as well as between the outboard surfaces of disc 24 and rim 26 not covered by insert 158. A second mold filling injection step is then performed, via a suitable second pour opening (not shown) provided in disc 24 communicating with cavity 170, to thereby fill cavity 170 with the liquid urethane reaction mixture as described above so as to completely fill the cavity space 170 to thereby form the urethane outer facing 156 of overlay 154. After this material has cured sufficiently for mold separation, the upper clamp is removed and the finished wheel 150 (FIG. 10) lifted from the lower mold part.

It will be seen from the foregoing that the decorative overlay body 154 will itself be a composite construction having a tough durable yet resilient urethane facing portion 156 securely adhered to the low density plastic material of insert 158, which in turn is adhesively secured to the metal surfaces of the disc and rim covered by insert 158. Overlay body portion 156 will also be directly adhesively secured to those outboard surfaces of the rim and/or disc exposed to mold cavity 170. Hence the advantages of the Adams type POLYCAST urethane overlay are retained while at the same time achieving a significant improvement in lowering the weight-to-volume ratio of the decorative composite overlay 154 as in the aforementioned Derleth '501 and Smith '476 patents.

It is also to be understood that, in a variation of the foregoing method in accordance with the present invention, insert 158 may be separately molded as a preform or bisquit which may be inserted into the disc-rim valley in a manner similar to inserts 100, 100' or 100" for temporary retention on the metal wheel subassembly, and then thus further assemblage fixtured on the mold to define the mold cavity 170 as in FIG. 9. In this modification, mat 160 would not be employed, and lower mold part 200 would only be employed for performing the second mold injection step described above to cast the urethane material in cavity 170 to form the urethane outer facing 156. It is also to be understood that the outboard face 172 of insert 158 need not exactly follow the contour of lower mold cavity surface 230 so long as the minimum thickness parameters described above are observed.

In a further variation of the foregoing method of making wheel 150, mat 160 may be eliminated and two different lower mold parts provided for use in successive molding steps. The first lower mold part (not shown) is constructed to have a upper mold-cavity-defining surface corresponding to that provided by surface 164 of mat 160 to thereby define mold cavity 166. Insert 158 is then molded in cavity 166 with the disc-rim subassembly fixtured on this first lower mold part. In the second stage, lower mold part 200 is employed to mold outer facing 156 in cavity 170. However, it will be understood that the relative advantages as between these alternative methods, and hence the choice of one over another, will vary in accordance with the particular styling features to be imparted to and by the decorative composite overlay 154, as well as with the particular materials chosen for use in the construction of overlay 154.

From the foregoing description, it will now be apparent that a composite styled metal-elastomeric wheel construction of the present invention provides an overall reduction in the weight-to-volume ratio of the decorative plastic overlay component and hence total wheel weight, while retaining the many advantages of the aforementioned Adams patent embodiments of POLYCAST wheel construction. The molding method and apparatus utilized to construct the improved wheel of the present invention is compatible with the prior commercial methods and apparatus for making the prior art POLYCAST wheels of this type, and hence there is a substantial savings in apparatus costs, and alterations required in the existing manufacturing process and equipment are minimized. In addition to reducing the total weight of the POLYCAST wheel construction, the present invention also can be used to advantage to reduce the material costs of the decorative plastic body by employing much less expensive materials in the construction of the embedded inserts 100, 100', 100" and/or 158 in the composite plastic overlay body. Since these permanently embedded inserts are hidden from view, their appearance is not a factor, and this offers a wider latitude in choice of materials and manufacturing tolerances. In the modified wheel 150 of the invention, the insert 158, when made of highly resilient light weight material such as foam rubber, will function as a yieldable core in the step of molding outer facing 156. This feature in turn automatically causes an increase in the cross-sectional thickness of outer facing 156 in the zones where insert 158 has the most "give". Hence, additional strength will be obtained in facing 156 from such increased section modulus precisely where needed to resist both outboard resilient-force-induced re-expansion upon demolding as well as inboard collapse in use.

It is also to be understood that, although the foregoing description and drawings describe and illustrate in detail various preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

We claim:

1. A method of making a lighter weight composite styled wheel of the type having a metallic portion comprising a wheel mounting disc and a rim secured to said disc and adapted to receive a tire thereon, said disc and rim having outboard faces converging at a juncture of said disc and rim and defining an annular valley space therebetween, and a plastic portion comprising an ornamental overlay body disposed adjacent and covering at least part of the outboard face of said metallic portion, said body being permanently adhesively affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said metallic portion and adapted to provide decorative contour over at least part of the metallic portion of said wheel, said disc and said body having a circular array of associated communicating vent openings respectively therein to provide air circulation through said wheel, at least said disc openings being disposed radially inwardly of the wheel relative to said annular valley space, said body having low density insert means permanently secured to said metallic portion by embedment in said body and comprising at least in part a light weight filler member hidden from view by the outboard face of said body, said method comprising the steps of pre-forming said insert means in the form of an annulus having a weight-to-volume ratio much less than that of said body plastic material, at least temporarily affixing said inert means to said metallic portion of said wheel by disposing said insert means at least in said valley space, and then casting a liquid body reaction material against said insert means and also directly against a contiguous outboard surface of said metallic portion to thereby completely engulf the outboard surface of said insert means with said body material prior to solidification thereof and to directly adhere said body to said metallic portion in surrounding wheel outboard relation to said insert means in a manner such as to prevent removal of said insert means from said body material after solidification of said body material and adherence thereof to said metallic portion, whereby said body comprises a high density solid elastomeric material cast from a liquid reaction material and said light weight filler member is permanently embedded in said case material upon solidification thereof.

2. A method of making a composite styled wheel as set forth in claim 1 wherein said step of preforming said insert means comprises in-situ casting the same from liquid reaction material against said metallic portion of said wheel such that said insert means is also permanently adhered by its own adhesion characteristics to said metallic portion of said wheel and is thereby formed in-situ into said light weight filler member prior to the step of casting of said body liquid body reaction material.

3. The method set forth in claim 2 further comprising the steps of providing a pre-formed mat-like core sheet having on its wheel outboard face substantially the contour of the outboard face of said body and having on its inboard face the contour defined by said insert means and contiguous surface of said metallic portion to which said body material is to be adhered in outboard surrounding relation to said insert means, then positioning said core sheet in a mold juxtaposed to the outboard face of said wheel metallic portion such that said sheet inboard face and said metallic portion contiguous surface define a first mold cavity in said mold having the shape of said insert means, then performing said step of in-situ casting of said insert means by filling said first mold cavity with said insert forming liquid reaction material and allowing the same to solidify to thereby in-situ form said light weight filler member, then removing said core-sheet from said mold, and then performing the step of casting said liquid body reaction material against said filler member and said metallic portion contiguous surface by filling a second mold cavity defined in said mold between the outboard surface of said filler member and a surface of said mold contoured to provide said body outboard face.

4. A method of making a composite styled wheel as set forth in claim 1 wherein said step of pre-forming said insert means comprises providing a predetermined length of flexible lightweight hollow tubing coiled into an at least almost circumferentially complete annulus adapted to nest in said annular valley space between the convergent outboard faces of said disc and rim leading to their juncture, and said step of at least temporarily affixing said insert means comprises nesting said tubing annulus in said valley space so as to mechanically lock said annulus at least temporarily therein with said annulus being disposed radially outwardly of said disc vent openings.

5. The method as set forth in claim 4 wherein said step of preforming said insert means further comprises forming said tubing annulus so as to have an outside cross-sectional configuration slightly larger than the dimension of the annular valley space in a direction radially of said wheel, and said step of at least temporarily affixing said insert means comprises inserting said pre-formed tubing annulus into said annular valley space with a slight press fit such that said tubing is slightly yieldably deformed between the juxtaposed valley space surfaces of said disc and rim to at least temporarily retain said tubing annulus nested therebetween.

6. The method as set forth in claim 5 wherein said step of preforming said insert means further comprises providing passageway means on the external surface of said tubing annulus such that flowby of the liquid reaction body material relative to said tubing annulus in a direction toward the inboard side of said wheel occurs via said annulus passageway means during said step of casting of said liquid body reaction material so that the same fills the interface region of the juxtaposed faces of said rim and disc in the vicinity of their juncture inboard of said tubing annulus.

7. A method of making a composite styled wheel as set forth in claim 1 wherein said casting step is performed in a mold with said metallic portion disposed above the cavity in which said liquid body reaction material is cast and cured.

8. The method as set forth in claim 1 wherein said insert means comprises a low density resilient member, and said liquid body reaction material is cast and cured against said insert member under pressure sufficient to yieldable permanently deform said insert member upon curing of said reaction material.

9. The method as set forth in claim 8 wherein said insert member is deformed sufficiently during the casting of the liquid reaction material to allow flow-by of said liquid reaction material into the interface region of the juxtaposed faces of said rim and disc.

10. The method as set forth in claim 8 wherein said insert member constitutes a greater portion by volume of said wheel than that of said body material.

11. The method as set forth in claim 10 wherein said body has a thickness dimension axially of the wheel which varies radially of the wheel across the outboard face of said body.

12. The method as set forth in claim 11 wherein said thickness dimension is at a maximum in that portion of said body contiguous to said insert member and is at a minimum in that portion of said body contiguous to said metallic portion.

13. The method as set forth in claim 12 wherein said liquid reaction cast and cure pressure causes said insert member to deform and thereby define a yieldable mold cavity surface to impart a variable thickness dimension to said body in that portion thereof contiguous to said insert member.

14. The method as set forth in claim 13 wherein said insert member comprises a resilient solid foam material.

* * * * *

UNITED STATES PATENT AND TRADEMARK OFFICE
CERTIFICATE OF CORRECTION

PATENT NO. : 5,128,085

DATED : July 7, 1992

INVENTOR(S) : Charles C. Post and Roger E. Swartz

It is certified that error appears in the above-indentified patent and that said Letters Patent is hereby corrected as shown below:

Column 17, line 27, Claim 1, "case" should be --cast--.

Signed and Sealed this

Twenty-fourth Day of August, 1993

Attest:

BRUCE LEHMAN

Attesting Officer

Commissioner of Patents and Trademarks